United States Patent [19]

Hrabák et al.

[11] 4,087,600
[45] May 2, 1978

[54] POLYMERS OF TETRACHLOROETHYL ESTERS OF UNSATURATED ORGANIC ACIDS, AND THE METHOD FOR THEIR PREPARATION

[75] Inventors: František Hrabák; Milan Bezděk; Karel Bouchal; Jan Lokaj, all iof Prague, Czechoslovakia

[73] Assignee: Ceskoslovenska akademie ved, Prague, Czechoslovakia

[21] Appl. No.: 679,023

[22] Filed: Apr. 21, 1976

Related U.S. Application Data

[62] Division of Ser. No. 427,430, Dec. 21, 1973, Pat. No. 3,974,205.

[30] Foreign Application Priority Data

Dec. 28, 1972  Czechoslovakia ................ 9030/72
Dec. 28, 1972  Czechoslovakia ................ 9031/72

[51] Int. Cl.$^2$ ................... C08F 18/00; C08F 120/00; C08F 270/00; C08F 2/00
[52] U.S. Cl. ................... 526/292; 526/88; 526/200; 526/218; 526/230
[58] Field of Search ................... 526/292

[56] References Cited

U.S. PATENT DOCUMENTS

3,882,169  5/1975  Hrabak et al. ................ 526/272
3,954,683  5/1976  Hrabak et al. ................ 526/292

*Primary Examiner*—Herbert J. Lilling

[57] ABSTRACT

The invention relates to tetrachloroethyl esters of unsaturated organic acids of the general formula I

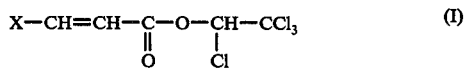 (I)

where X stands for a substituent selected from the group consisting of COOH, CCOCH$_3$, COOC$_2$H$_5$,

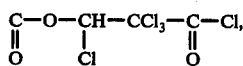

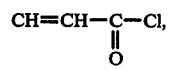

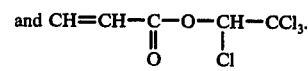

It further relates to their polymers and mixed polymers of the above monomers, namely with vinyl and diene compounds, and to methods for preparation both monomers and these polymers.

To prepare the compounds of the general formula I, acyl chloride of the general formula II

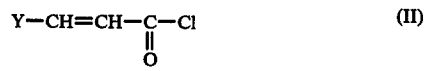 (II)

where Y stands for a substituent selected from the group consisting of COOH, COOCH$_3$, COOC$_2$H$_5$,

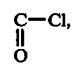

and

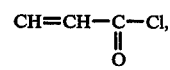

is treated with chloral, advantageously in the presence of a mineral acid or salt, for example with addition of sulfuric acid and ferric chloride, respectively.

10 Claims, No Drawings

POLYMERS OF TETRACHLOROETHYL ESTERS OF UNSATURATED ORGANIC ACIDS, AND THE METHOD FOR THEIR PREPARATION

This is a Divisional application of Ser. No. 427,430, filed Dec. 21, 1973 now U.S. Pat. No. 3,974,205.

The invention relates to tetrachloroethyl esters of unsaturated organic acids of the gernal formula I

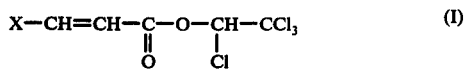

where X stands for a substituent selected from the group consisting of COOH, COOCH$_3$, COOC$_2$H$_5$,

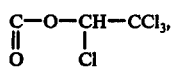

COCl, CH=CH—C—Cl,
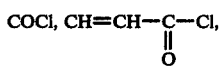

and 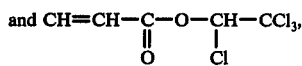

and further to their polymers, mixed polymers, namely with other vinyl and diene compounds, and to methods for preparation of both monomers of the general formula I, and their homopolymers or mixed polymers.

These compounds of the general formula I can be produced, according to the invention, by treatment of $n$ moles of acyl chloride of the general formula II

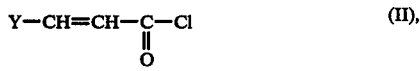

where Y stands for a substituent selected from the group consisting of COOH, COOCH$_3$, COOC$_2$H$_5$, COCl, or

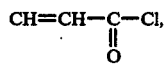

with 0.5 to 2$n$ moles of chloral.

The pure components or their solution can be used for the above addition. The reaction is accelerated by addition of a small amount of acids, for instance, concentrated sulfuric acid, or some salts, for example ferric chloride. Those solvents can be used, which do not react with both starting components at all, for instance, chloroform, diethyl ether, tetrachloromethane, or which react only slightly, for example, benzene or toluene.

Acyl chloride and chloral are usually used in the stoichiometric ratio, but the ratio may deviate from the stoichiometric one for various reasons. For example, an excess of one component can be used to exploit the other component completely for the reaction or to compensate its loss in a side reaction.

The reaction is suitably started at the temperature 0° to 50° C and completed by heating the reaction mixture, possibly as high as to its boiling temperature. The catalyst concentration may vary, according to the purity and reactivity of the starting components, in the range from 0 to 5% based on chloral, however 1% w/w of the initial amount of chloral is usually sufficient. In the production of 1,2,2,2-tetrachloroethyl β-vinylacrylate, the polymerization of β-vinylacryloyl chloride and its addition product with chloral is reduced by addition of an inhibitor of free radical polymerization into the reaction mixture. The addition compounds of chloral with fumaric and muconic acids do no homopolymerize. The final products can be easily isolated by fractionated distillation of the reaction mixture under reduced pressure or by its mere washing with water or aqueous solutions of mineral acids and bases, after the solvent has been removed by distillation. The solid products can be readily recrystallized from organic solvents.

The method for producing 1,2,2,2-tetrachloroethyl esters of unsaturated dicarboxylic acid monochloride of the general formula III

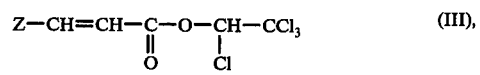

where Z is COCl or CH=CHCOCl, consists in heating of bis(1,2,-2,2-tetrachloroethyl) ester of the above acid with 0.1 to 5% of ferric chloride and isolation of the resulting 1,2,2,2-tetrachloroethyl ester of this dicarboxylic acid monochloride by fractionated distillation or crystallization of the reaction mixture.

The prepared unsaturated esters of the general formula I are combusted in a flame of gas burner, but they extinguish outside the flame. Because of the easy preparation of starting compounds of the general formula II and their moderate price, it may be assumed that acrylates and methacrylates with high content of chlorine prepared in this way will find their application as monomers and comonomers for preparation of polymeric materials with suppressed flammability.

Solutions, aqueous emulsions or suspensions of the monomers may be used in polymerization instead of pure compounds of the general formula I.

All initiators or initiation systems commonly used for a radical polymerization of known monomers with unsaturated bonds can be applied to start the polymerization of the described esters, as for example, dibenzoyl diperoxide and azobisisobutyronitrile.

The polymerization temperature is chosen according to the character of initiator or initiation system used, to obtain sufficiently rapid decay of the initiator into free radicals. Thus, for example, when the initiation redox systems commonly used for emulsion polymerization are applied, the polymerization rate is sufficiently high in the temperature region from 0° to 30° C already, while in the bulk polymerization of the unsaturated compound initiated with hydroperoxides, the polymerization mixture has to be heated to 100° – 120° C.

All vinyl or diene compounds proved to be able to homopolymerize or copolymerize by the radical mechanism with other unsaturated compound, namely with fumaric and maleic derivatived, can be used as comonomers of the esters having the general formula I.

The method for producing monomers — tetrachloroethyl esters of unsaturated organic acids and the method for their polymerization and copolymerization are illustrated in the following examples.

EXAMPLE 1

β-Vinylacryloyl chloride (50 g) is added into a stirred mixture of 75 g of chloral, 150 ml of benzene, 1 g of ferric chloride, and 0.5 g of hydroquinone at the laboratory temperature during 60 minutes. The mixture is moderately warmed by the reaction heat and, after the addition of acyl chloride has been completed, it was slowly heated in a water bath to the boiling temperature. Benzene is then removed by distillation under reduced pressure at 40° - 50° C and the residue is fractionated through an effective column (6 theoretical plates) in vacuum of a rotation pump. By repeated fractionation of the main fraction, 60 g of 1,2,2,2-tetrachloroethyl β-vinylacrylate is obtained, which has b.p. 53° - 55° C/0.1 Torr and the refrective index $n_D^{20}$ 1.5095. Elemental analysis: found C 32.05%, H 2.40%, Cl 53.30%; calculated C 31.85%, H 2.28%, Cl 53.73%.

EXAMPLE 2

A mixture consisting of 11.5 g of fumaroyl chloride, 30 g of chloral and 0.3 g of ferric chloride was slowly heated in a flask provided with a mechanical stirrer and a reflux condenser gradually to the temperature 60° C. It was then maintained at this temperature for 5 hours. The viscous reaction mixture is then dissolved in 200 ml of chloroform and concentrated by distillation to the volume 60 – 70 ml. Bis-(1,2,2,2-tetrachloroethyl) fumarate crystallized in the amount of 19.5 g (the yield of fumeroyl chloride 58%), and melted at 144° C after repeated crystallization from chloroform.

EXAMPLE 3

Concentrated sulfuric acid (0.5 g) is added into a solution of 11.5 g of fumaroyl chloride and 25 g of chloral in 40 ml of benzene. The mixture is then refluxed for 8 hours, cooled, and washed with water, aqueous solution of NaHCO$_3$ and, eventually, with 100 ml of chloroform. The organic layer is dried over anhydrous sodium sulfate and concentrated. Bis-(1,2,2,2-tetrachloroethyl) fumarate crystallizes in the amount of 18 g, m.p. 141° - 143° C.

EXAMPLE 4

A 100 ml flask with side neck is charged with 96 g of bis-(1,2,2,2-tetrachloroethyl) fumarate and 0.5 g of sublimated FeCl$_3$. The reaction mixture is heated to 150° C and the flask is then provided with a distillation capillary tube and descending condenser. The main fraction is collected, from the distillation in vacuum of a rotation pump, boiling in the region 70° - 110°/0.2 Torr. It was further rectified on a column from concentric tubes and 63.5 g of pure 1,2,2,2-tetrachloroethyl fumarate monochloride was obtained; b.p. 85° C/0.1 Torr, $n_D^{20}$ = 1.5180 and $d_4^{20}$ = 1.5877. Molecular weight: found 305; calculated 300. Elemental analysis: found C 24.25%, H 1.18%, Cl 59.27%; calculated C 23.99%, H 1.01%, Cl 59.02%.

EXAMPLE 5

A mixture consisting of 11.5 of fumaroyl chloride, 30 g of chloral and 0.3 g of ferric chloride is slowly heated to reflux in a flask provided with a mechanical stirrer and a reflux condenser. The reflux was maintained for 5 hours. By distillation of the dark reaction mixture under reduced pressure, 16 g of the main fraction is obtained; b.p. 70° - 110° C/0.2 Torr. It is further rectified on a column from concentric tubes (6 theoretical plates) and gives 13.5 g of 1,2,2,-2-tetrachloroethyl fumarate monochloride; b.p. 85° C/0.1 Torr. The yield is 40% on the starting fumaroyl chloride.

EXAMPLE 6

A 500 ml three-neck flask provided with a stirrer thermometer and reflux condenser, is charged with 95 g of fumaroyl chloride, 183 g of freshly distilled chloral, 220 g of dry chloroform and, after mixing, with 0.5 g of sublimated ferric chloride. The mixture is moderately warmed by the reaction heat. The reaction flask is then heated in a water bath to 50° C for 2 hours and to 70° C for one hour. The warm reaction mixture is filtered, a part of the solvent is distilled off and the residue gives after cooling 216 g of the crystalline product (78% on the starting fumaroyl chloride). Pure bis(1,2,2,2-tetrachloroethyl) fumarate is prepared by the repeated crystallization from a mixture chloroform — 10% of petroleum ether. White crystals melting 144° - 145° C are very well soluble in chlorinated hydrocarbons, well soluble in aromatic hydrocarbons, alcohols, ketones, and low soluble in petroleum ether and water. Elemental analysis: found C 21.63%, H 0.8%, Cl 62.6%; calculated C 21.46%, H 0.90%, Cl 63.35%.

EXAMPLE 7

Into a solution of 60.5 g (40 ml) of anhydrous chloral in 40 ml of anhydrous chloroform, 1.5 g of anhydrous ferric chloride is added and a solution of 34 g of muconic dichloride in 45 ml of chloroform is dropped under vigorous stirring. After the exothermic reaction ceased, the reaction mixture is heated in a water bath to 60° C for 3 hours. Then it is cooled down to the laboratory temperature and extracted twice with 300 ml of water. The chloroformic layer is separated, dried over anhydrous sodium sulfate and chloroform is removed by distillation. The residual oily product crystallizes by treatment with heptane. Crystalline bis(1,2,2,2-tetrachloroethyl) muconate, melting 127° C, is obtained by recrystallization of the raw product from a mixture chloroform — heptane in the yield of 62 g (about 70%. According to analysis, it contains C 25.79%, H 1.40%, and Cl 59.20%; calculated C 25.36%, H 1.27%, Cl 59.85%. The product after three recrystallizations is pure according to GPC test and its IR and NMR spectra agree with the assumed structure. The compound does not homopolymerize.

EXAMPLE 8

A solution of 0.06 g of diisopropyl peroxodicarbonate in 10 g of 1,2,2,2-tetrachloroethyl β-vinylacrylate (b.p. 53° - 55° C/0.1 Torr, $n_D^{20}$ 1.5095) is charged into a glass ampoule, cooled to the temperature — 78° C, and the ampoule is freed from air by an alternate evacuation and charging with nitrogen. Then it is sealed and heated in a thermostated bath for 12 hours to 25° C. The polymer is removed from the ampoule and extracted with ether. The extracted polymer (8.7 g) is rubber-like and does not dissolve in aromatic or chlorinated hydrocarbons; only swells. It is combusted in a flame of gas burner but extinguishes outside the flame.

EXAMPLE 9

A mixture consisting of 5 g of 1,2,2,2-tetrachloroethyl β-vinylacrylate, 5 ml of benzene and 0.05 g of 2,2'-azobisisobutyronitrile is heated in a sealed glass ampoule freed from air for 12 hours to 70° C. The polymer is then precipitated with methanol in the amount of 3.2 g, and is soluble in benzene.

EXAMPLE 10

A glass ampoule is charged with 1.77 g of styrene, 1.15 g of bis-(1,2,2,2-tetrachloroethyl) fumarate and 0.007 g of 2,2'-azobisisobutyronitrile. The ampoule is freed from air in the same way as in Example 8, sealed and heated for 48 hours to 70° C. The solution is converted into a hard, milky clouded plug, soluble in benzene. It burns in a flame of gas burner and extinguishes outside the flame and contains 25.77% Cl according to analysis.

EXAMPLE 11

A glass ampoule is charged with 0.5 g of styrene, 1.0 g of bis(1,2,2,2-tetrachloroethyl) fumarate and 2.2 ml of benzene, which contains 0.0033 g of 2,2'-azobisisobutyronitrile. The ampoule is freed from air analogously, as in Example 8, sealed and heated to 50° C for 46 hours. The polymer (1 g), which is soluble in benzene, is precipitated from the reaction mixture by methanol. It burns in a flame of gas burner, but it extinguishes outside the flame. Analysis gives 39.4% Cl.

EXAMPLE 12

A mixture consisting of 1.50 g of styrene, 0.3 g of butadiene, 1.2 g of bis(1,2,2,2-tetrachloroethyl) fumarate, 0.01 g of 2,2'-azobisisobutyronitrile, 0.2 g of potassium phosphate, 0.25 g of Mersolate and 6 ml of distilled water is sealed in a glass ampoule. The ampoule is placed into a thermostated bath heated to 60° C and revolves there around its perpendicular axis. After 10 hours, the resulting latex is poured into 25 ml of methanol. The precipitated polymer (1.96 g) is colorless, tough and soluble in benzene. Analysis gives 26.7% Cl.

EXAMPLE 13

A small polymerization reactor with a stirrer is charged with 1.8 g of styrene, 1.2 g of bis(1,2,2,2-tetrachloroethyl) fumarate, 0.025 g of 2,2'-azobisisobutyronitrile and the mixture is homogenized by stirring at 50° C. Distilled water (20 ml) with 0.5 g of starch is then added, the temperature is raised to 80° C and the mixture is polymerized with steady stirring for 5 hours. The copolymer, which separates after cooling, is washed with warm water and dried to the constant weight (2.3 g). The copolymer is soluble in benzene, burns in a flame of gas burner but extinguishes outside the flame. Analysis gives 26.2% Cl.

EXAMPLE 14

A glass ampoule is charged with 1.46 g of 1,2,2,2-tetrachloroethyl ester of fumaric acid monochloride, 0.09 g of styrene and 0.0007 g of 2,2'-azobisisobutyronitrile. The ampoule is cooled to −78° C, freed from air by an alternate evacuation and nitrogen charging, sealed, and heated first for 12 hours to 50° C and then for another 12 hours to 70° C. The solution is transformed into a hard, milky clouded plug, which is insoluble in aromatic and chlorinated solvents. It burns in a flame of a gas burner, but immediately extinguishes the flame. Analysis gives 34.6% of chlorine.

EXAMPLE 15

A glass ampoule is charged with 2 g of bis-(1,2,2,2-tetrachloroethyl) muconate, 1 g of styrene and 4 ml of benzene which contains 0.020 g of 2,2'-azobisisobutyronitrile. The ampoule is then freed from air in the same way as in Example 14, sealed and heated for 60 hours to 60° C. From the broken ampoule, the solid polymer is obtained, which is insoluble in benzene. It is extracted by chloroform and dried in vacuo at the laboratory temperature, giving the yield 95% related to the starting amounts of monomers. Its analysis shows 38.9% of chlorine. The copolymers are analogously prepared from monomer mixtures, where styrene and bis-(1,2,2,2-tetrachloroethyl) muconate are in molar ratios 1:1, 2:1, and 5:1.

The homopolymers and mixed polymers from compounds of the general formula I have the suppressed flammability or are self-extinguishing. Therefore, they can be used for purposes where the suppressed flammability or non-flammability of polymeric materials is required. It can be produced from the low-cost monomers by usual industrial methods of polymerization in bulk, solution, aqueous emulsion and suspension. Properties of the mixed polymers from the unsaturated esters of the general formula I can be modified retaining the suppressed flammability and may find their use as elastomers, thermoplastics, as well as thermosetting plastics.

We claim:

1. A method of producing polymers of a tetrachloroethyl ester of an unsaturated organic acid having the formula $$X-CH=CH-\underset{\underset{O}{\parallel}}{C}-O-\underset{\underset{Cl}{\mid}}{CH}-CCl_3 \qquad I$$

wherein X stands for a substituent selected from the group consisting of COOH, COOCH$_3$, COOC$_2$H$_5$,

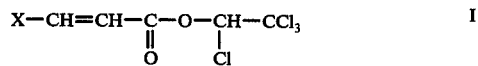

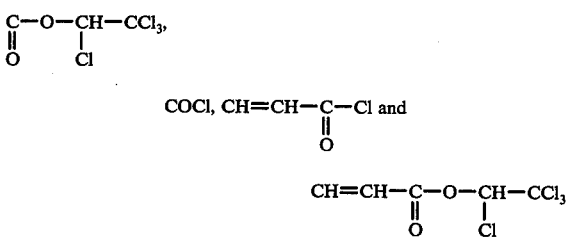

which comprises the steps of heating said ester in the presence of a free-radical polymerization initiator to the temperature of decay of the initiator into free radicals and recovering the polymer thereby formed.

2. A method according to claim 1 wherein there is additionally present at least one other monomer selected from the group consisting of vinyl and diene compounds and recovering the copolymer thereby formed.

3. A method according to claim 1 wherein said ester is used in the form of a solution, aqueous emulsion or suspension thereof.

4. A method according to claim 2 wherein said additional monomer is selected from the group of styrene, butadiene and mixtures thereof.

5. The homopolymers produced by the process of claim 1.

6. The copolymers produced by the process of claim 2.

7. The copolymer produced by the process of claim 2 wherein said tetrachloroethyl ester is bis-(1,2,2,2-tetrachloroethyl)fumarate and said additional monomer is styrene.

8. The copolymer produced by the process of claim 2 wherein said tetrachloroethyl ester is bis-(1,2,2,2-tetrachloroethyl)fumarate and said additional monomers are styrene and butadiene.

9. The copolymer produced by the process of claim 2 wherein said tetrachloroethyl ester is bis-(1,2,2,2-tetrachloroethyl)muconate and said additional monomer is styrene.

10. The polymer produced by the process of claim 1 wherein said tetrachloroethyl ester is bis-(1,2,2,2-tetrachloroethyl)fumanate.

* * * * *